(12) United States Patent
Gwak

(10) Patent No.: US 7,804,524 B2
(45) Date of Patent: Sep. 28, 2010

(54) IMAGE EDITING METHOD FOR DIGITAL IMAGE PROCESSING APPARATUS

(75) Inventor: Jin-pyo Gwak, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 916 days.

(21) Appl. No.: 11/699,155

(22) Filed: Jan. 26, 2007

(65) Prior Publication Data

US 2008/0089616 A1   Apr. 17, 2008

(30) Foreign Application Priority Data

Oct. 16, 2006   (KR) .................. 10-2006-0100387

(51) Int. Cl.
*H04N 5/228* (2006.01)
(52) U.S. Cl. .................. 348/222.1; 348/231.3
(58) Field of Classification Search .......... 348/220.1, 348/222.1, 231.2, 231.3, 333.05
See application file for complete search history.

(56) References Cited

U.S. PATENT DOCUMENTS 4,827,347 A * 5/1989 Bell .................. 348/333.05

2003/0090575 A1 * 5/2003 Miyamoto .............. 348/207.99
2006/0055944 A1 * 3/2006 Minakuti et al. .............. 358/1.2
2006/0274164 A1 * 12/2006 Kimura et al. ........... 348/231.3
2009/0180005 A1 * 7/2009 Takahashi ................ 348/231.2

FOREIGN PATENT DOCUMENTS

JP   07-303234 A   11/1995
JP   2004-080614 A   3/2004

* cited by examiner

*Primary Examiner*—Gevell Selby
(74) *Attorney, Agent, or Firm*—Drinker Biddle & Reath LLP

(57) ABSTRACT

Provided is a method of operating a digital image processing apparatus, and more particularly, an image editing method for a digital image processing apparatus, whereby a plurality of images captured in a continuous shooting mode can be collectively or individually edited. The image editing method is used to operate a digital image processing apparatus, and the image editing method includes: taking photographs in a continuous shooting mode in which a plurality of images are captured by pressing a shutter-release button one time; recognizing the captured images as images captured in the continuous shooting mode; and applying the same editing operation to all of the images recognized as the images captured in the continuous shooting mode.

17 Claims, 14 Drawing Sheets

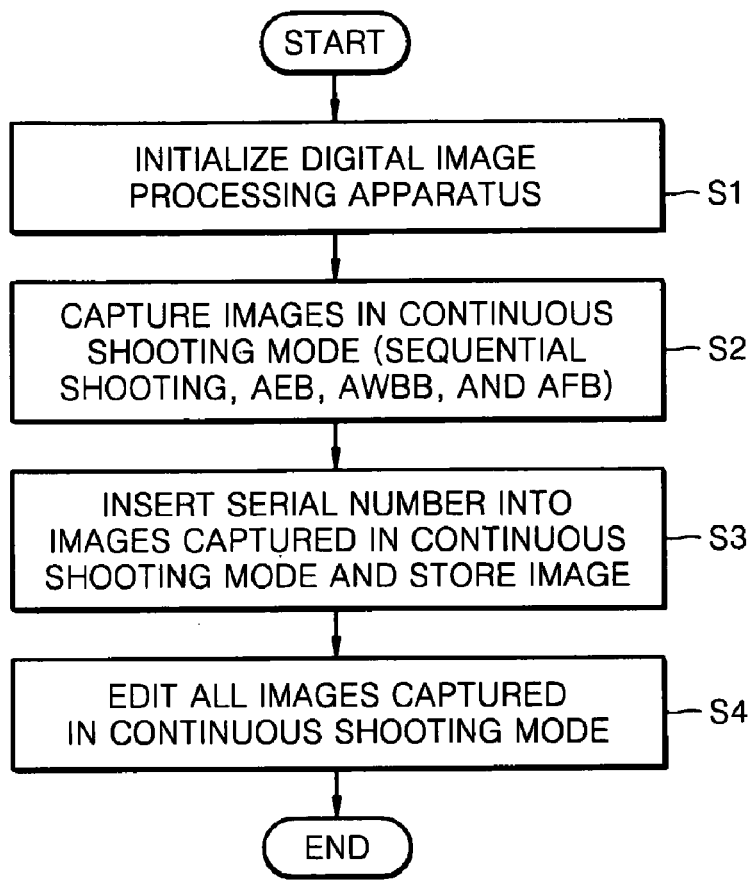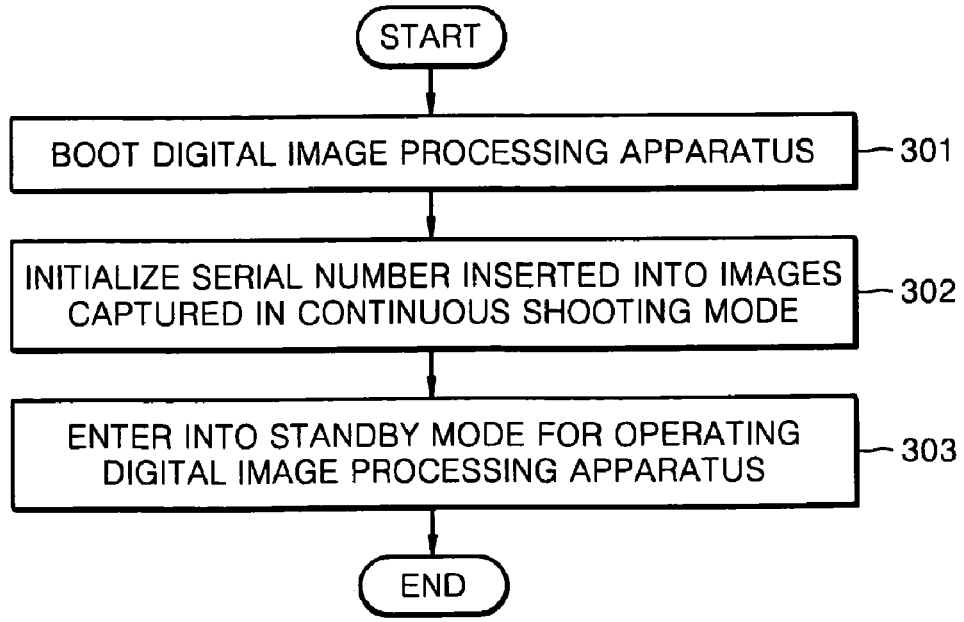

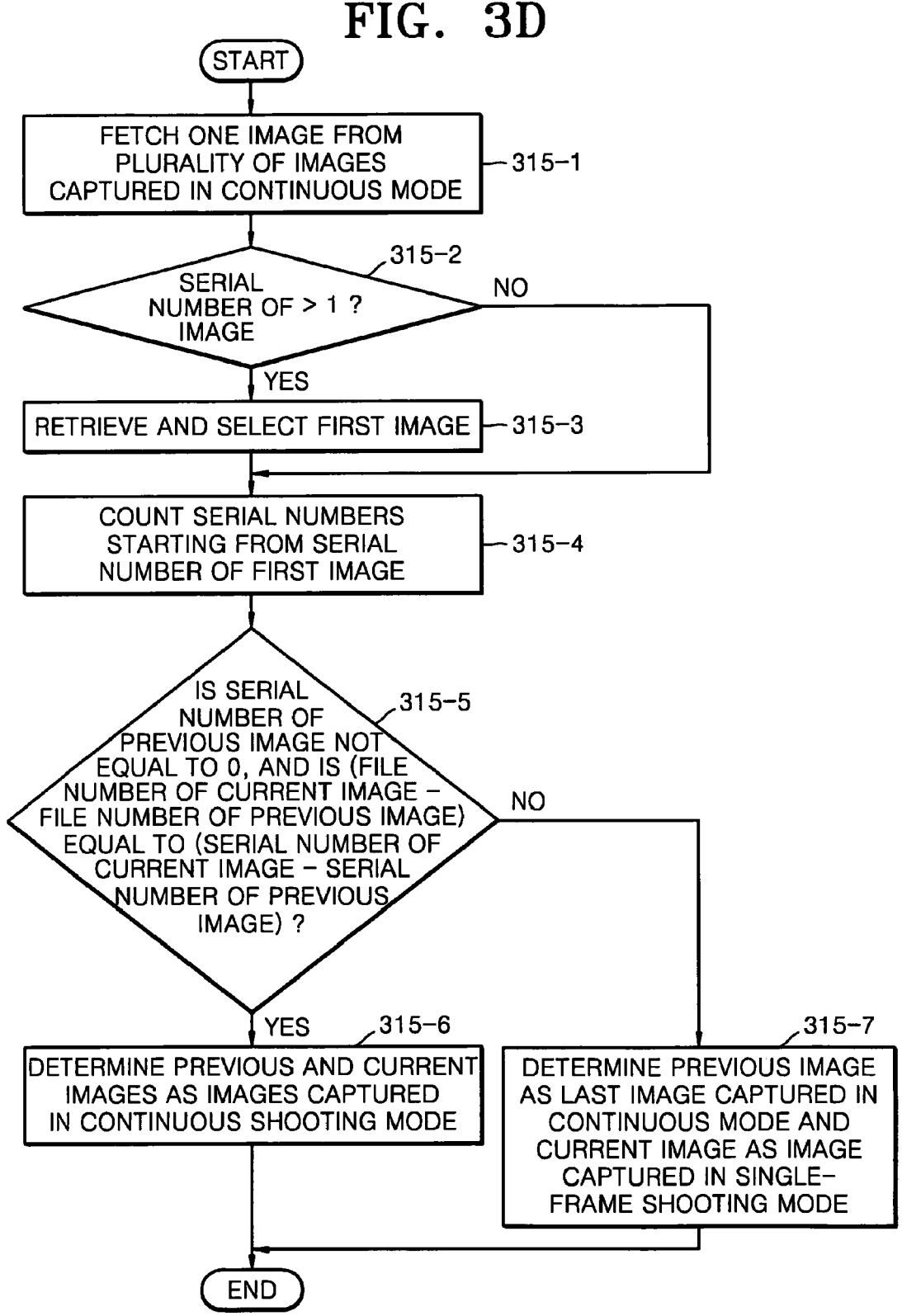

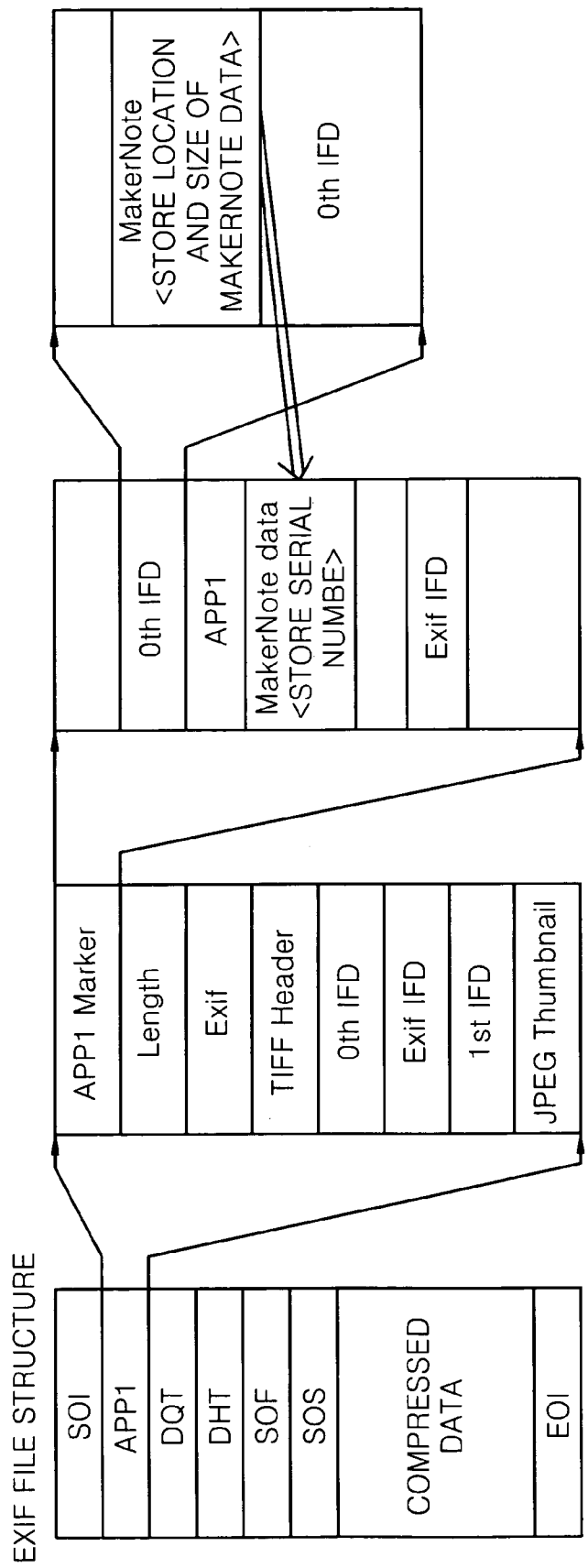

IMAGE EDITING METHOD FOR DIGITAL IMAGE PROCESSING APPARATUS

CROSS-REFERENCE TO RELATED PATENT APPLICATION

This application claims the benefit of Korean Patent Application No. 10-2006-0100387, filed on Oct. 16, 2006, in the Korean Intellectual Property Office, the disclosure of which is incorporated herein in its entirety by reference.

BACKGROUND OF THE INVENTION

1. Field of the Invention

The present invention relates to a method of operating a digital image processing apparatus, and more particularly, to an image editing method for a digital image processing apparatus, in which a plurality of images captured in a continuous shooting mode can be collectively or individually edited.

2. Description of the Related Art

Digital image processing apparatuses have a single-frame shooting mode in which one image is captured when a shutter-release button is pressed and a continuous shooting mode in which a plurality of images are continuously captured while the shutter-release button is pressed and held down. The continuous shooting mode may be divided into a normal sequential shooting mode and a bracketing mode according to a user's choice.

The bracketing mode includes an auto exposure bracketing (AEB) mode in which a plurality of images (for example, three images) are continuously captured by pressing down the shutter-release button while exposure conditions for each image are adjusted, an auto white balance bracketing (AWBB) mode in which a plurality of images are continuously captured by pressing down the shutter-release button while color conditions for each image are adjusted, and an auto focus bracketing (AFB) mode in which a plurality of images are continuously captured by pressing down the shutter-release button while focusing conditions for each image are adjusted.

The images captured in the continuous shooting mode are stored after being subjected to compression signal processing. Thereafter, when a user retrieves the stored images, the images captured in the continuous shooting mode can be retrieved.

In general, when image editing is performed by a digital image processing apparatus, the user first retrieves one image to be edited before the image is edited (for example, image rotation, color adjustment, etc). However, since there is no function whereby the images captured in the continuous shooting mode can be collectively edited, in order to edit the images, theses images have to be inconveniently dealt with one by one.

SUMMARY OF THE INVENTION

The present invention provides an image editing method for a digital image processing apparatus, in which identification numbers are inserted into a plurality of images captured in a continuous shooting mode so that the images can be distinguished from images captured in a single-frame shooting mode, and the same attribute of editing can be collectively or individually applied to the images inserted with the identification numbers.

According to an aspect of the present invention, there is provided an image editing method for operating a digital image processing apparatus, comprising: (a) taking photographs in a continuous shooting mode in which a plurality of images are captured by pressing a shutter-release button one time; (b) recognizing the captured images as images captured in the continuous shooting mode; and (c) applying the same attribute of editing to all of the images recognized as the images captured in the continuous shooting mode.

According to another aspect of the present invention, there is provided an image editing method for operating a digital image processing apparatus, comprising: (a) initializing an identification number to be inserted into an image to be captured; (b) taking photographs in a continuous shooting mode in which a plurality of images are captured by pressing a shutter-release button one time; (c) inserting identification numbers into the captured images in ascending order; and (d) applying the same editing operation to all of the images inserted with the identification numbers.

According to another aspect of the present invention, there is provided an image editing method for operating a digital image processing apparatus, the method comprising: (a) checking a last inserted identification number; (b) taking photographs in a continuous shooting mode in which a plurality of images are captured by pressing a shutter-release button one time; (c) inserting the same identification number which is distinguishable from the last inserted identification number to the images captured in (b); and (d) applying the same attribute of editing to the images inserted with the identification numbers.

BRIEF DESCRIPTION OF THE DRAWINGS

The above, and other features and advantages of the present invention will become more apparent by describing in detail exemplary embodiments thereof with reference to the attached drawings in which:

FIG. 2 is a flowchart illustrating an operation of an image editing method for a digital image processing apparatus according to an embodiment of the present invention;

FIGS. 3A to 3E are flowcharts illustrating in greater detail an image editing method of FIG. 2 according to an embodiment of the present invention;

FIG. 4 illustrates the structure of an exchangeable image file format (Exif) file used in an image editing method of FIG. 2 to store identification numbers;

DETAILED DESCRIPTION OF THE INVENTION

Hereinafter, the present invention will be described in detail by explaining exemplary embodiments of the invention with reference to the attached drawings.

Figure 1:
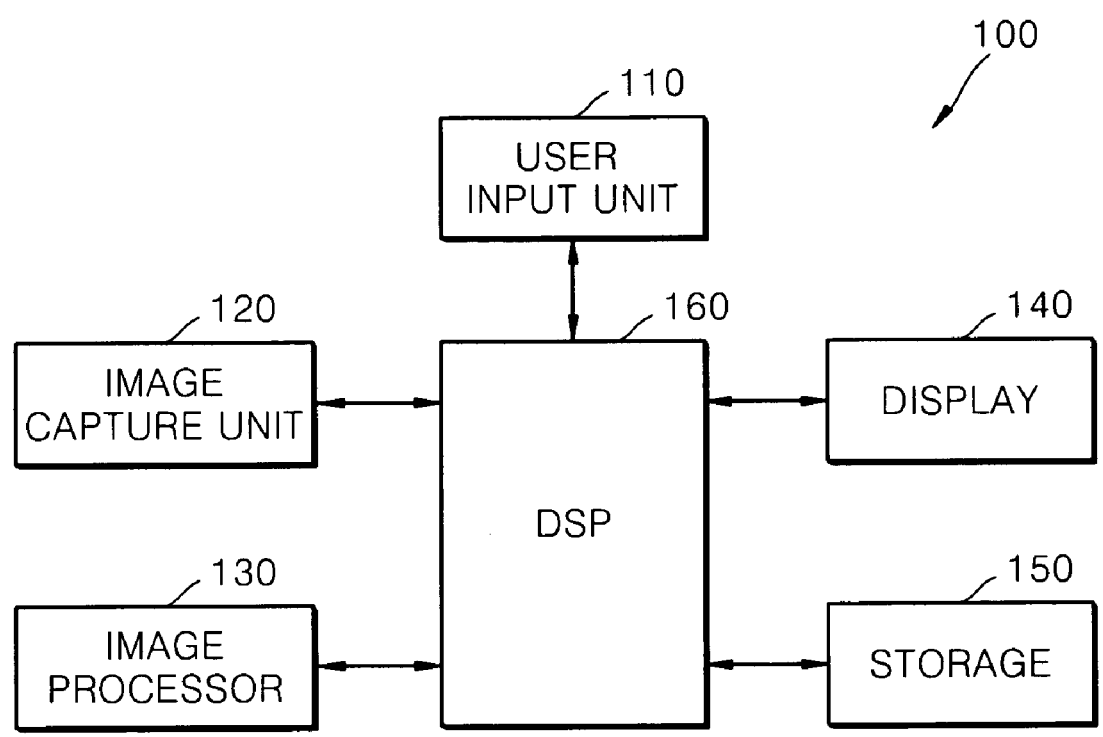
FIG. 1 is a block diagram illustrating the structure of a digital image processing apparatus.

FIG. 1 is a block diagram illustrating the structure of a digital image processing apparatus. The digital image processing apparatus 100 includes a user input unit 110, an image capture unit 120, an image processor 130, a display 140, a storage 150, and a digital signal processor (DSP) 160.

Figure 5:
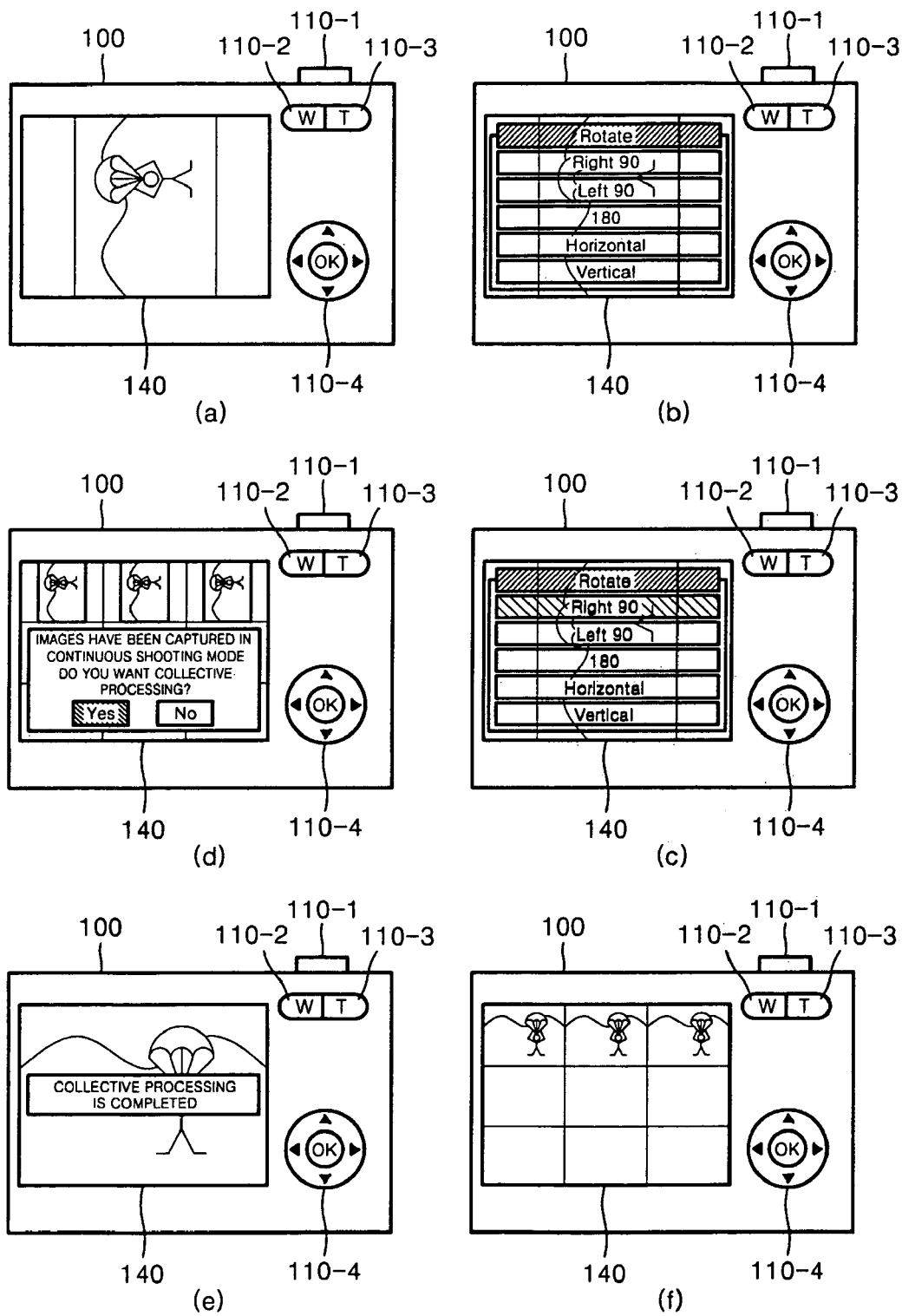
FIG. 5 illustrates an example of collectively edited images captured in a continuous shooting used in an image editing method of FIG. 2.

Referring to FIG. 5, which is an exterior view of a typical digital image processing apparatus 100, the user input unit 110 includes a shutter-release button 110-1 which is pressed and released so as to expose a charge coupled device (CCD) or a film to light for a predetermined time, a wide-angle-zoom button 110-2 and a telephoto-zoom button 110-3 which respectively widen and narrow an image angle when pressed, and a function button 110-4 which browses various menus, items, and functions in association with operations of the digital image processing apparatus 100.

Referring again to FIG. 1, the image capture unit 120 includes a lens, an iris diaphragm, a CCD, and an analog-digital converter (ADC), each of which is not shown.

The shutter regulates the intensity of exposure light along with the iris diaphragm. The lens receives light from an external light source to process an image. The iris diaphragm regulates the intensity of incident light (light quantity) according to the degree of opening and closing thereof. The degree of opening and closing of the iris diaphragm is controlled by the DSP 160.

The CCD accumulates the light quantity received through the lens. According to the accumulated light quantity, the CCD outputs an image picked up by the lens in response to a vertical synchronization signal. The digital image processing apparatus 100 obtains an image when the CCD converts light from a subject for photography into an electrical signal. To obtain a color image by using the CCD, a color filter is required. In general, a filter (not shown) called a color filter array (CFA) is used. The CFA has a regular array structure in which each pixel transmits only a single color of light. Various shapes of the CFA can be realized according to the array structure. The ADC converts an analog image signal output from the CCD into a digital signal.

The image processor 130 processes the converted digital image signal to obtain a displayable image. An element used in the CCD and the CFA is sensitive to a temperature change. A dark current is generated according to a temperature variation. The dark current induces a darkness which is not desirable as an image signal. The image processor 130 removes the darkness generated by the dark current.

Furthermore, the image processor 130 performs a gamma correction. According to Weber's law, the human visual sensation is nonlinearly responsive to brightness. Thus, a posterization occurs when the brightness of light is recorded linearly within a given limited bit depth. For this reason, in order to show the best image quality under the given bit depth, encoding has to be carried out by using a non-linear function. The gamma correction is defined as an encoding process in which information is encoded in association with non-linearity of the human visual sensation. In the gamma correction of the image processor 130, an image signal input on the basis of a gamma curve is output after being subjected to the gamma correction. For example, a 12-bit input luminance level of an image signal may be corrected into an 8-bit luminance level and then output.

The image processor 130 performs a CFA interpolation whereby a Bayer pattern formed with an RGRG line and a GBGB line of specific gamma-corrected data is interpolated into an RGB line. In the CFA interpolation of the image processor 130, three channels of R, G, and B are restored such that a G channel is first restored from pixels having only R or B channel value, and empty values are then filled in the order (or reverse order) of a B channel and an R channel.

The image processor 130 converts the interpolated RGB signal into a YUV signal. Then, the image processor 130 performs an edge correction whereby a Y-signal is filtered by a high band filter to attain a clear image, and a color correction whereby color values of the U and V-signals are corrected by using a standard color coordinate, thereby removing noise thereof.

The image processor 130 compresses or signal-processes the noise-removed Y, U, and V signals so as to generate an exchangeable image file format (Exif) file. The generated Exif file is displayed on the display 140 and is stored in the storage 150 according to the user's choice.

All operations of the image processor 130 are performed under the control of the DSP 160. In particular, when the user selects a continuous shooting mode, through the aforementioned signal processing, the image processor 130 generates a plurality of Exif files for a plurality of images captured by pressing the shutter-release button one time. The generated Exif files are stored in the storage 150. The DSP 160 inserts an identification serial (hereinafter, referred to as a serial number) into an image captured in the continuous shooting mode. Thereafter, the user retreives the images into which serial numbers have been inserted, and collectively edits the images under the control of the DSP 160.

Now, an image editing method for a digital image processing apparatus will be described in detail with reference to FIGS. 2 to 7. As shown in FIG. 1, the image editing method may be performed in the digital image processing apparatus 100. According to embodiments of the present invention, a main algorithm of the editing method may be performed in the DSP 160 in cooperation with elements included in the digital image processing apparatus 100.

FIG. 2 is a flowchart illustrating an operation of an image editing method for a digital image processing apparatus according to an embodiment of the present invention. First, the DSP 160 initializes the digital image processing apparatus 100 according to the user's choice (operation S1). When the user turns on power, the DSP 160 boots the digital image processing apparatus 100. According to embodiments of the present invention, the DSP 160 may initialize a serial number to be inserted into an image captured in the continuous shooting mode, or checks a serial number to be inserted into a last image captured in the continuous shooting mode.

When the initialization of the digital image processing apparatus 100 is completed, an image is captured according to the type of continuous shooting mode selected by the user (operation S2). In order to select a desired continuous shooting mode, the user selects a menu of the continuous shooting mode by using the function button 110-4 (FIG. 5) included in the digital image processing apparatus 100. As described above, in the continuous shooting mode, a plurality of images are captured by pressing the shutter-release button 110-1. For example, the user may select any one of a normal sequential shooting mode, an auto exposure bracketing (AEB) mode, an auto white balance bracketing (AWBB) mode, and an auto focus bracketing (AFB). When the user selects one of these continuous shooting modes and presses the shutter-release button 110-1, the DSP 160 controls the image capture unit 120 to capture a plurality of images. Further, the DSP 160 controls the image processor 130 to perform image processing.

In order to recognize the images captured in a continuous shooting mode, the DSP 160 inserts serial numbers into each image captured in the continuous shooting mode, controls image processing, and stores the images in the storage 150 (operation S3). Under the control of the DSP 160, the image processor 130 signal-processes the images captured in the continuous shooting mode so as to generate a plurality of Exif files. The DSP 160 stores the serial numbers in a MakerNote data area included in an APPI Maker area of an APPI area of the Exif file structure illustrated in FIG. 4.

The images inserted with serial numbers and stored in the storage 150 can be retrieved by the user's choice. When an image is edited the same editing operation can be applied to all images captured in the continuous shooting mode as selected by the user (operation S4). When the user selects the playback of an image captured in the continuous shooting mode, the DSP 160 retrieves its inserted serial number to display the image captured in the continuous shooting mode. Subsequently, if the user selects an image editing menu, the DSP 160 inquires the user whether to apply the selected editing menu to all images captured in the continuous shooting mode. When the user confirms to apply the editing to all images, the same editing operation is applied to all of the images captured in the continuous shooting mode. The DSP 160 may apply the same editing operation to some of the images selected by the user. The image editing menu includes all editing functions provided by the digital image processing apparatus 100 such as an image rotation and a color conversion.

Accordingly, when taking photographs, images captured in the continuous shooting mode are stored after being inserted with serial numbers. In addition, when the images are displayed and edited, the images captured in the continuous shooting mode are first retrieved by using the inserted serial numbers and are then displayed. Thereafter, the images can be collectively edited.

The image editing method will be described according to two embodiments of the present invention. One embodiment is illustrated in FIGS. 3A to 3E. In this embodiment, serial numbers are stored after being inserted into images captured in a continuous shooting mode in ascending order. When the images are selected and edited, the images captured in the continuous shooting mode are retrieved by using the serial numbers inserted in ascending order. Thereafter, the same editing operation is applied to all of the retrieved images. The other embodiment is illustrated in FIGS. 7A to 7E. In this embodiment, the same serial numbers are stored after being inserted into images captured in a continuous shooting mode. When the images are selected and edited, the images captured in the continuous shooting mode are retrieved by using the same serial numbers. Thereafter, the same editing operation is applied to all of the retrieved images.

Now, the image editing method according to the embodiment of the present invention illustrated in FIGS. 3A to 3E will be described.

Figure 3B:
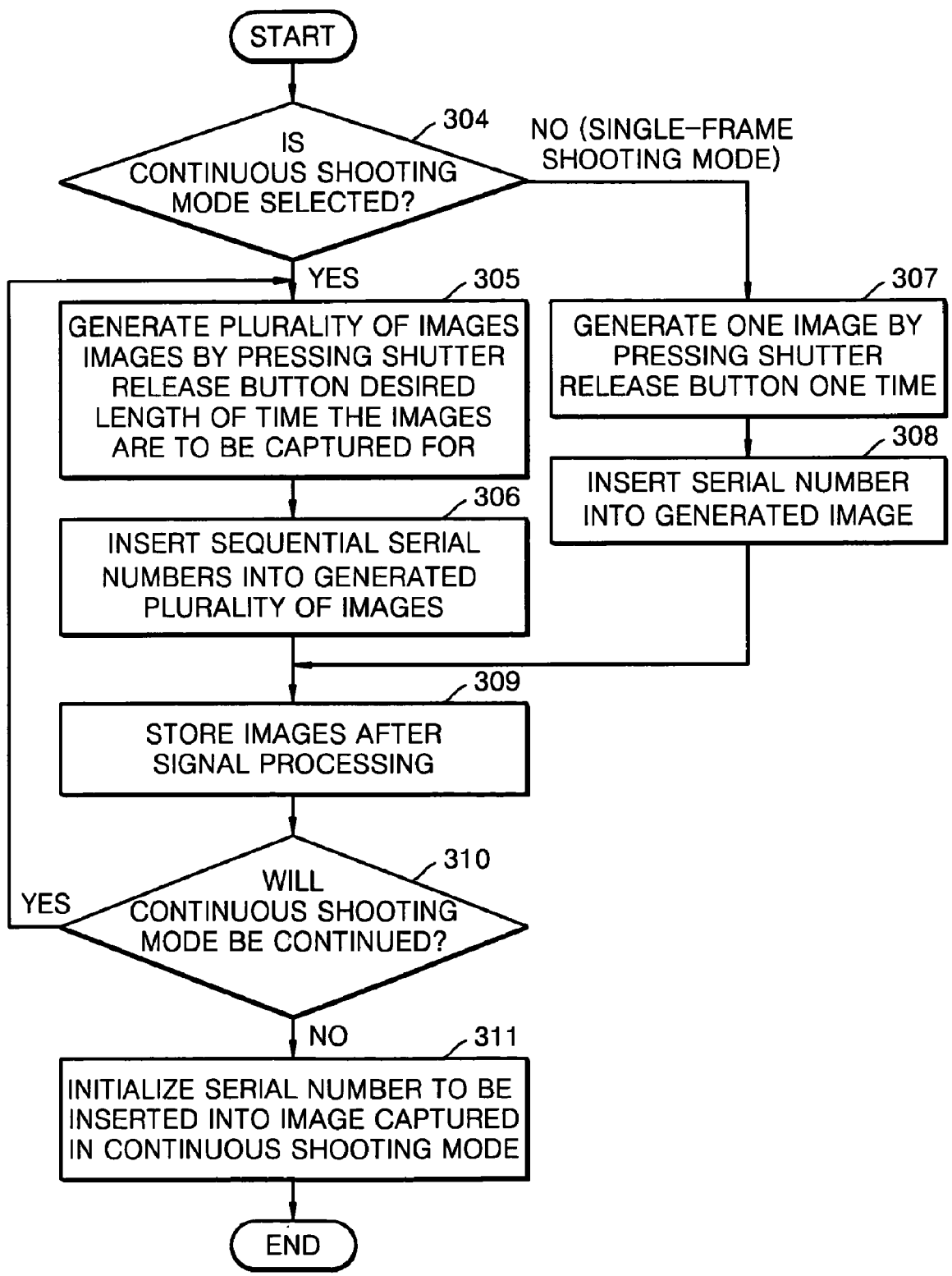

FIGS. 3A to 3E are flowcharts illustrating, in greater detail, an image editing method of FIG. 2 according to an embodiment of the present invention. Referring to FIG. 3A, operation S1 of FIG. 2 for initializing the digital image processing apparatus 100 will be described in detail.

First, when the user turns on power, the DSP 160 boots the digital image processing apparatus 100 (operation 301).

When booting is completed, the DSP 160 initializes a serial number to be inserted into an image captured in a continuous shooting mode (operation 302).

When the initialization of the serial number is completed, the DSP 160 enters into a standby mode for waiting for a user input so as to operate the digital image processing apparatus 100 (operation 303).

Referring to FIG. 3B, operations S2 and S3 of FIG. 2 for inserting and storing a serial number after an image is captured in a continuous shooting mode will be described in detail.

The DSP 160 determines whether the user selects a continuous shooting mode (operation 304).

If the user selects the continuous shooting mode, when the user presses the shutter-release button 110-1, the DSP 160 recognizes this and generates a plurality of images (operation 305).

Thereafter, the DSP 160 sequentially inserts serial numbers into the images (operation 306). The DSP 160 sequentially inserts the serial numbers into the images captured in the continuous shooting mode in ascending order. For example, serial numbers of 1, 2, and 3 may be sequentially inserted into three captured images. Although the identification numbers are inserted in the numeric format, the present invention is not limited thereto. For example, the serial numbers may be alphabet characters or special symbols.

FIG. 4 illustrates the structure of an Exif file generated by the image processor 130 under the control of the DSP 160. In an application market segment 1 (APP1) area of the Exif file, additional information (e.g. a shooting time of compressed image data and a product name) or thumbnail information is stored. An APP1 Market area of the APP1 area includes a MakerNote data area that can be used according to a manufacturers preference. The DSP 160 stores a serial number in the MakerNote data area. The location and size of the MakerNote data area storing the serial number are stored in a MakerNote area included in a $0^{th}$ image file directory (IFD) area.

Referring again to FIG. 3B, if the user selects a single-frame shooting mode, when the user presses the shutter-release button 110-1, the DSP 160 recognizes this and generates one image (operation 307).

Thereafter, the DSP 160 inserts a serial number into the generated image (operation 308). The DSP 160 inserts another serial number which is different from the serial number inserted into an image captured in a continuous shooting mode, for example, "0", into the image captured in the single-frame shooting mode. As shown in FIG. 4, the DSP 160 stores the serial number inserted into the image captured in the single-frame shooting mode in the MakerNote data area of the APP1 Marker area of the APP1 area of the Exif file. Similarly, the DSP 160 stores the location and size of the MakerNote data area storing the serial number in the MakerNote area of the $0^{th}$ IFD area of the APP1 Market area of the APP1 area of the Exif file.

A plurality of images captured in the continuous shooting mode and inserted with serial numbers in ascending order, or an image captured in the single-frame shooting mode and inserted with another serial number are subjected to signal processing by the image processor 130 under the control of the DSP 160 and are thereafter stored in the storage 150 (operation 309).

The DSP 160 determines whether the user intends to continue the continuous shooting mode. If the continuous shooting mode is selected to be continued, the process returns to operation 305 (operation 310).

If the continuous shooting mode is not continued, the DSP 160 initializes the serial number to be inserted into the image captured in the continuous shooting mode (operation 311).

Figure 3C:
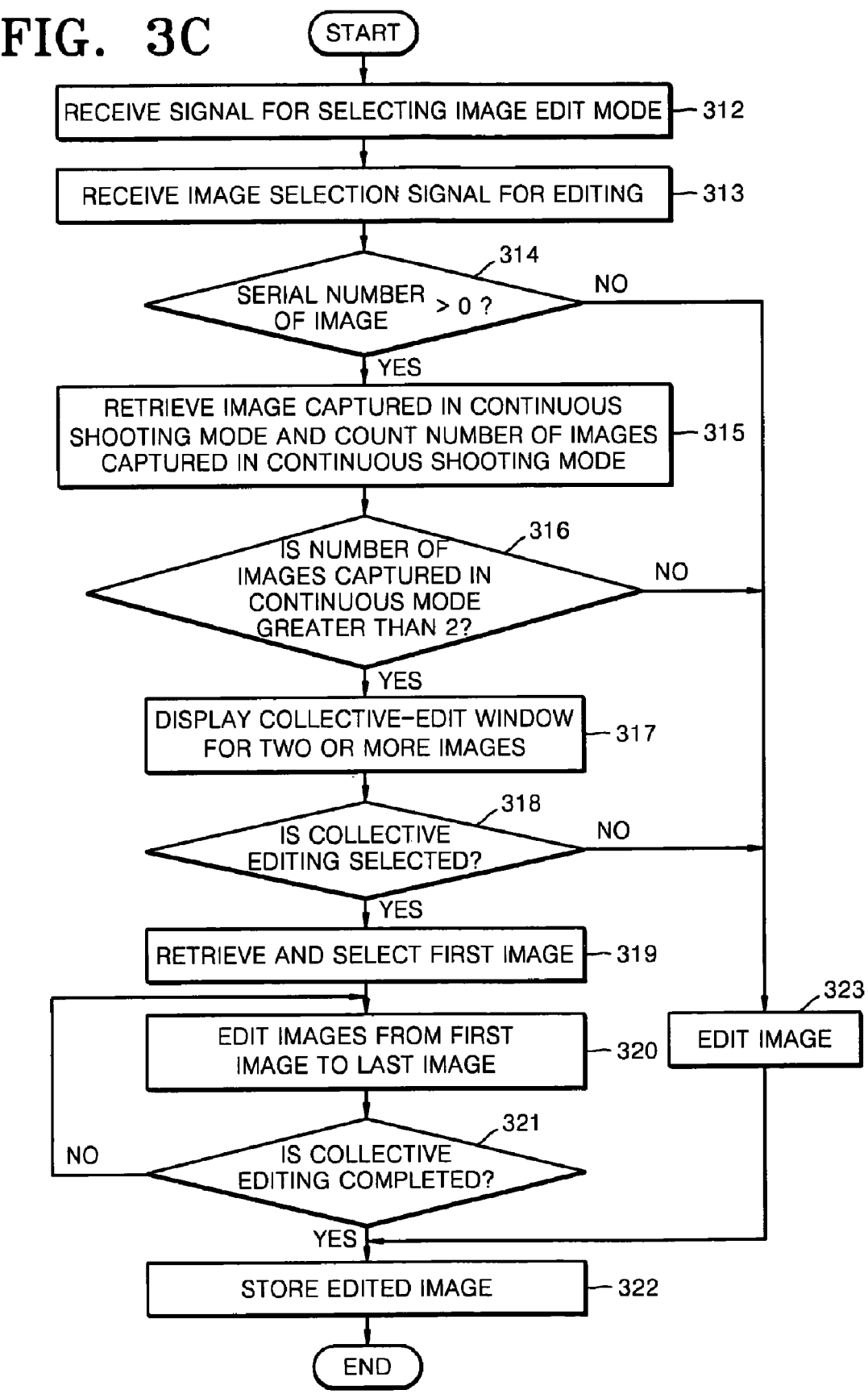

Referring to FIG. 3C, operation S4 of FIG. 2 for editing an image captured in a continuous shooting mode will be described in detail.

In order to edit an image, the user selects a desired editing mode from an image editing menu provided by the digital image processing apparatus 100. Then, the DSP 160 receives a signal for selecting an image editing mode (operation 312).

After the image editing mode is selected, the user selects an image to be edited. When the image is selected, the DSP 160 receives an image selection signal (operation 313).

After receiving the image selection signal, the DSP 160 retrieves a serial number inserted into the selected image so as to determine whether the retrieved serial number is greater than 0 (operation 314). The DSP 160 checks the location of the MakerNote data area via the APP1 area, the APP1 Marker area, the $0^{th}$ IFD area, and the MakerNote area of the Exif file. Thereafter, the DSP 160 retrieves 15 the serial number stored in the MakerNote data area via the APP1 area, the APP1 Maker area, and the MakerNote data area, so as to determine whether the retrieved serial number is greater than 0.

If the serial number stored in the MakerNote data area is greater than 0, the DSP 160 determines that the selected image is captured in the continuous shooting mode. Then, the DSP 160 retrieves the image captured in the continuous shooting mode, and counts the number of images captured in the continuous shooting mode (operation 315).

Images captured in the continuous shooting mode can be retrieved in two ways. First, images are captured in the continuous shooting mode, and some of them are deleted by the user, so that the number of retrieved images is only one. For example, three images can be captured in the continuous shooting mode shooting, and then the user can delete two images leaving only one image. Thus, only one image remains even when in the continuous shooting mode. Like this example, the DSP 160 can retrieve the image which has been captured in the continuous shooting mode but remains alone because the user has deleted the rest of the images. Second, images are captured in the continuous shooting mode, and the images are not deleted by the user, or even if deleted, a plurality of image captured in the continuous shooting mode are still retrieved. In this case, the DSP 160 counts the number of images captured in the continuous shooting mode.

FIG. 3D illustrates a second case of operation 315 of FIG. 3C, that is, images are captured in the continuous shooting mode, and the images are not deleted by the user, or even if deleted, a plurality of image captured in the continuous shooting mode are still retrieved.

First, the DSP 160 fetches one image of a plurality of images captured in the continuous shooting mode from the storage 150 (operation 315-1).

Thereafter, the DSP 160 determines whether a serial number of the fetched image is greater than 1 (operation 315-2). Since a serial number retrieving method has been described above, descriptions thereof will be omitted.

If the serial number of the fetched image is greater than 1, the DSP 160 determines that the image is not a first image of the images captured in the continuous shooting mode. Then, the DSP 160 retrieves and selects the first image (operation 315-3).

Figure 3E:
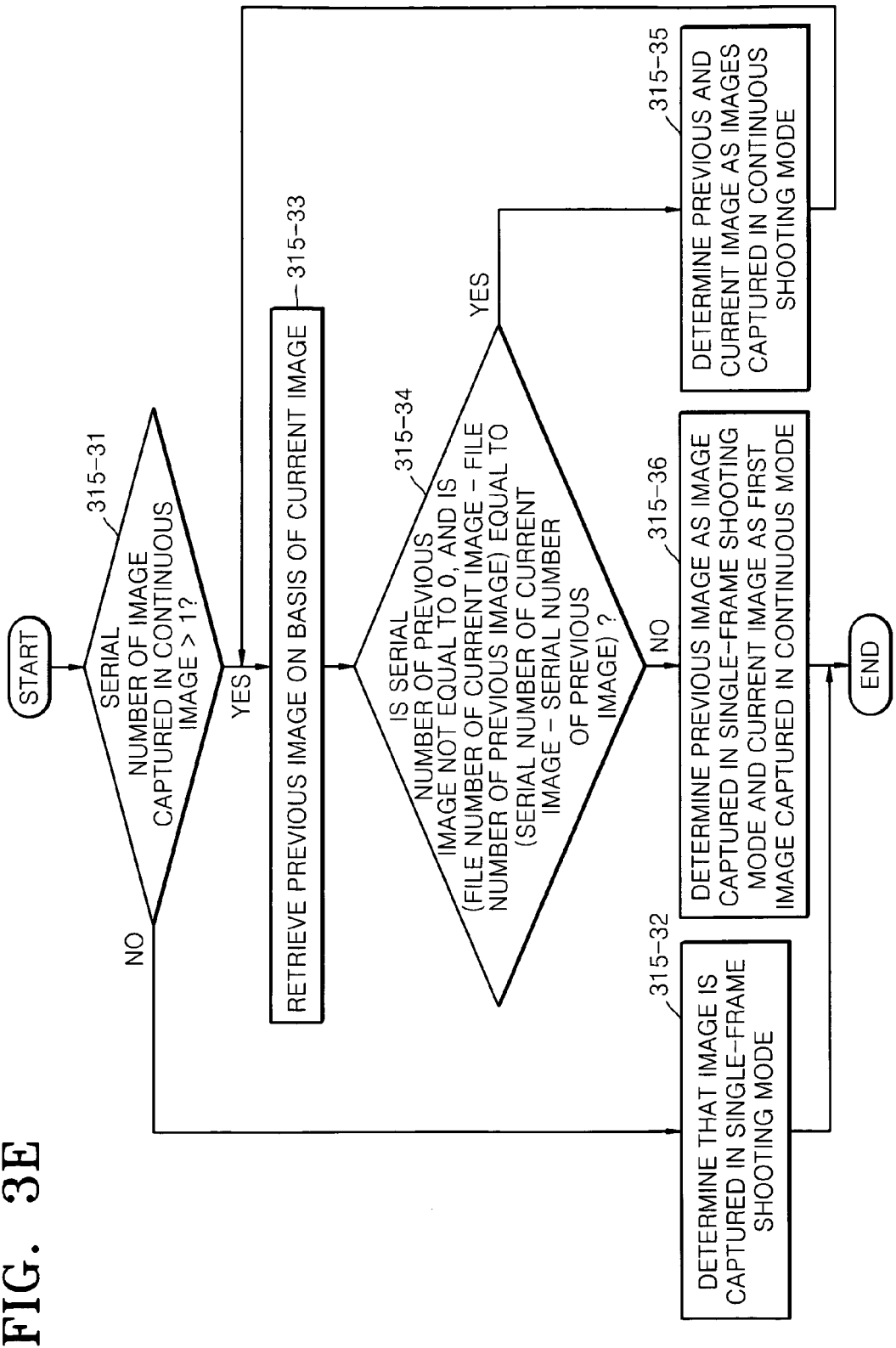

FIG. 3E illustrates a method of the operation 315-3 of FIG. 3D of retrieving and selecting the first image captured in the continuous shooting mode.

The DSP 160 determines whether a serial number of an image captured in the continuous shooting mode is greater than 1 (operation 315-31). If the serial number of the image captured in the continuous shooting mode is not greater than 1, that is, the serial number is equal to 0, then the DSP 160 determines that the image is captured in the single-frame shooting mode, and the process is terminated (operation 315-32).

On the other hand, if the serial number of the image captured in the continuous shooting mode is greater than 1, the DSP 160 retrieves a previous image based in reference to the current image (operation 315-33).

While retrieving, the DSP 160 determines whether a serial number of the previous image is not equal to 0, and whether (a file number of a current image—a file number of a previous image) is equal to (a serial number of a current image—a serial number of a previous image) (operation 315-34). The DSP 160 performs this operation to determine the first image captured in the continuous shooting mode.

If the DSP 160 determines that the serial number is not equal to 0, and (a file number of a current image—a file number of a previous image) is equal to (a serial number of a current image—a serial number of a previous image), then the current and previous images are determined to be images captured in the continuous shooting mode (operation 315-35).

On the other hand, if the DSP 160 determines that the serial number is not equal to 0, and (a file number of a current image—a file number of a previous image) is not equal to (a serial number of a current image—a serial number of a previous image), then the previous image is determined to be an image captured in the single-frame shooting mode, and the current image is determined to be the first image captured in the continuous shooting mode (operation 315-36).

After the current image is captured, the file number of the current image is stored to have the following file number with respect to the file number of the previous image. For example, if the previous image has a file name of sa700004.jpg with a file number of 700004, the current image has a file name of sa700005.jpg with a file number of 700005, and the next file has a file name of sa700006.jpg with a file number of 700006.

For example, it will be assumed that an image having a file name of sa700003.jpg is generated in the single-frame shooting mode, and its serial number is 5. After the image is captured in the single-frame shooting mode, three images having file names of sa700004.jpg, sa700005.jpg, and sa700006.jpg are captured in the continuous shooting mode. Then, a serial number of the image of sa700004.jpg is "1", a serial number of the image of sa700005.jpg is "2", and a serial number of the image of sa700006.jpg is "3".

In this case, if the previous image has a file name of sa70005.jpg and a serial number of "2" and the current image has a file name of sa700006.jpg and a serial number of "3", since the serial number of the previous image is "2", the DSP 160 determines that the serial number is not equal to 0, and (a file number included in the file name (sa700006.jpg) of the current image—a file number included in file name (sa700005.jpg) of the previous image) is equal to (a serial number (3) of the current image—a serial number (2) of the previous image). Thus, the previous and current images are determined to be images captured in the continuous shooting mode.

However, if the previous image has a file name of sa700003.jpg and a serial number of "5", and the current image has a file name of sa700004.jpg and a serial number of "1", since the serial number of the previous image is "5", the DSP 160 determines that the serial number is not equal to 0 as (a file number included in the file name (sa700004.jpg) of the current image—a file number included in file name (sa700003.jpg) of the previous image) is not equal to (a serial number (1) of the current image—a serial number (5) of the previous image). Thus, the previous image is determined not to be an image captured in the continuous shooting mode along with the current image, and the current image is determined to be the first image captured in the continuous shooting mode.

In operation 315-3, if a serial number of an image is 1, the DSP 160 determines that the image is the first image of the images captured in the continuous shooting mode. After the first image captured in the continuous shooting mode is selected in operation 315-36, the DSP 160 counts serial numbers (starting from the serial number of the first image in the ascending order (operation 315-4).

Subsequently, the DSP 160 determines whether a serial number of the previous image is not equal to 0, and whether (a file number of a current image—a file number of a previous image) is equal to (a serial number of a current image—a serial number of a previous image) (operation 315-5). The DSP 160 performs this operation to determine a last image captured in the continuous shooting mode.

If the DSP 160 determines that the serial number is not equal to 0-, and (a file number of a current image—a file number of a previous image) is equal to (a serial number of a current image—a serial number of a previous image), then the current and previous images are determined to be images captured in the continuous shooting mode (operation 315-6).

On the other hand, if the DSP 160 determines that the serial number is not equal to 0, and (a file number of a current image—a file number of a previous image) is not equal to (a serial number of a current image—a serial number of a previous image), then the current image is determined to not be an image captured in the continuous mode along with the previous image, and the previous image is determined to be the last image captured in the operation of the previous continuous shooting mode (operation 315-7).

For example, after an image is captured in the single-frame shooting mode, if three images having file names of sa700004.jpg, sa700005.jpg, and sa700006.jpg are captured in the continuous shooting mode, a serial number of the image of sa700004.jpg is "1", a serial number of the image of sa700005.jpg is "2", and a serial number of the image of sa700006.jpg is "3". Further, after taking photographs in the continuous shooting mode, an image is captured in the single-frame shooting mode to have a file name of sa700007.jpg and a serial number of "6".

In this case, if the previous image has a file name of sa700005.jpg and a serial number of "2", and the current image has a file name of sa700006.jpg and a serial number of "3", since the serial number of the previous image is "2", the DSP 160 determines that the serial number is not equal to 0, and (a file number included in the file name (sa700006.jpg) of the current image—a file number included in file name (sa700005.jpg) of the previous image) is equal to (a serial number (3) of the current image—a serial number (2) of the previous image). Thus, the previous and current images are determined to be images captured in the continuous shooting mode.

However, if the previous image has a file name of sa700006.jpg and a serial number of "3", and the current image has a file name of sa700007.jpg and a serial number of "6", since the serial number of the previous image is "3", the DSP 160 determines that the serial number is not equal to 0, but (a file number included in the file name (sa700007.jpg) of the current image—a file number included in file name (sa700006.jpg) of the previous image) is not equal to (a serial number (6) of the current image—a serial number (3) of the previous image). Thus, the current image is determined to be an image captured in the single-frame shooting mode, and the previous image is determined to be the last image captured in the continuous shooting mode.

Accordingly, the number of images captured in the continuous shooting mode can be counted.

Returning to FIG. 3C, the DSP 160 counts the number of images captured in the continuous shooting mode so as to determine whether the number of images captured in the continuous shooting mode is greater than 2 (operation 316).

If the number of images captured in the continuous shooting mode is greater than 2, the DSP 160 displays a collective-edit window for two or more images (operation 317). In this case, the DSP 160 may display the collective-edit window in a state that images captured in the continuous shooting mode are displayed on the display 140 in a thumbnail image format. For example, the DSP 160 may display the collective-edit window showing a message of "The images are continuous. Do you want batch processing?" on the display 140.

If a collective editing is selected (operation 318), the DSP 160 retrieves and selects the first image (operation 319). Then, the DSP 160 sequentially edits images from the first image to the last image (operation 320). Since the retrieval of the first and last images has been described above, descriptions thereof will be omitted.

If the DSP 160 determines that editing has been completed for all images captured in the continuous mode from the first image to the last image (operation 321), the edited images are stored (operation 322).

Although not shown, if the number of images captured in the continuous shooting mode is greater than 2, when the DSP 160 displays the collective-edit window for two or more images, the user may select collective or individual editing. In this case, the image(s) to be edited is selected by using the function key 110-4 from all of the images captured in the continuous shooting mode, and the same editing may be applied to only the images selected by using the function button 110-4.

Referring to FIG. 3C, if an image has a serial number of 0, or the number of images captured in the continuous shooting mode is 1, or only one image is edited through the collective editing window, image editing is performed only for an associated image (operation 323).

FIG. 5 illustrates an example of collectively editing images captured in the continuous shooting mode. Referring to FIG. 5A, an image captured in the continuous shooting mode is displayed. Referring to FIG. 5B, the displayed image is rotated in an editing process. Referring to FIG. 5C, an operation for rotating an image by 90 degrees to the right is selected during the editing process. Referring to FIG. 5D, all images captured in the continuous mode are displayed in a thumbnail image format, and a window inquiring whether the images are to be collectively edited. Furthermore, if the user selects to collectively edit the images then content indicating that collective editing will be carried out is displayed. Referring to FIG. 5E, a message window is displayed showing that all images captured in the continuous shooting mode have been collectively edited. Referring to FIG. 5F, the result of collectively edited images are shown in the thumbnail image format.

Figure 6:
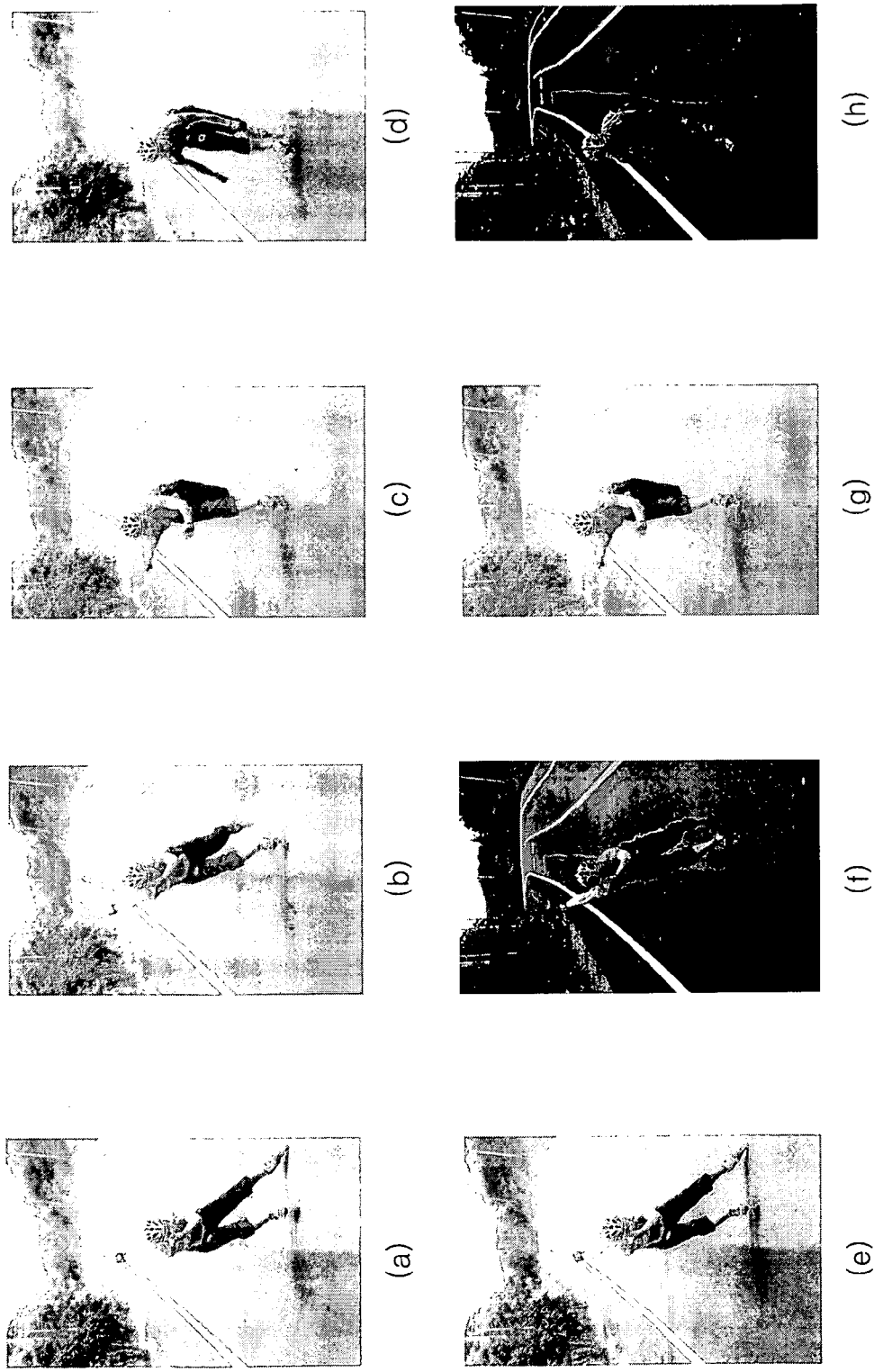
FIG. 6 illustrates an example of individually edited image captured in a continuous shooting mode used in a image editing method of FIG. 2.

FIG. 6 illustrates an example of individually edited images captured in the continuous shooting mode. Images captured in the continuous shooting mode are shown in FIGS. 6A to 6D. The result of the individually edited images are shown in FIGS. 6E to 6H. In FIG. 6, the user selects to only images of FIGS. 6B and 6D to perform an editing process of color correction. The result thereof is shown in FIGS. 6F and 6H.

Now, an image editing method according to another embodiment of the present invention will be described with reference to FIGS. 7A to 7E.

Figure 7A:
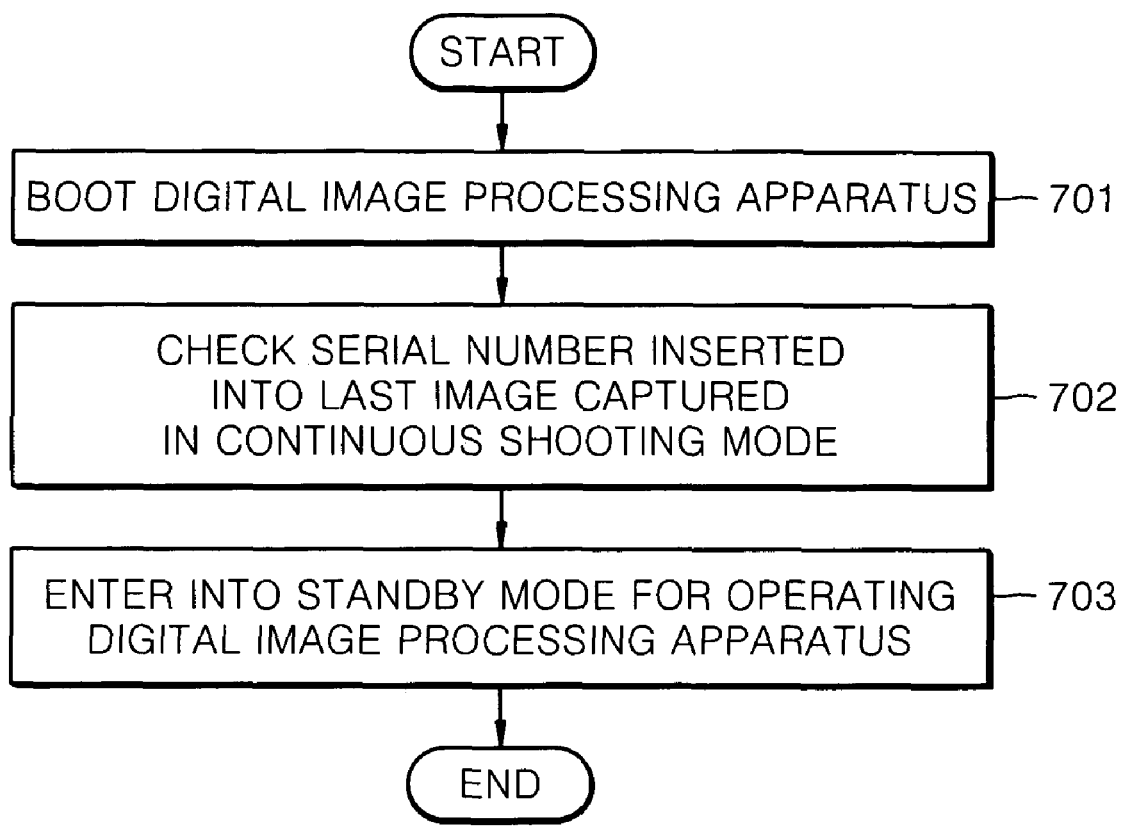
FIGS. 7A to 7E are flowcharts illustrating in greater detail an image editing method of FIG. 2 according to another embodiment of the present invention.

Referring to FIG. 7A, operation S1 of FIG. 2 for initializing the digital image processing apparatus 100 will be described in detail.

First, when the user turns on power, the DSP 160 boots the digital image processing apparatus 100 (operation 701).

When booting is completed, the DSP 160 checks a serial number inserted into a last image captured in the continuous shooting mode (operation 702). The reason for the DSP 160 to check the serial number inserted into the last image captured in the continuous shooting mode is to distinguish a serial number to be inserted into a new image captured in the continuous shooting mode.

When the checking of the last serial number is completed, the DSP 160 enters into a standby mode for waiting for a user input so as to operate the digital image processing apparatus 100 (operation 703).

Figure 7B:
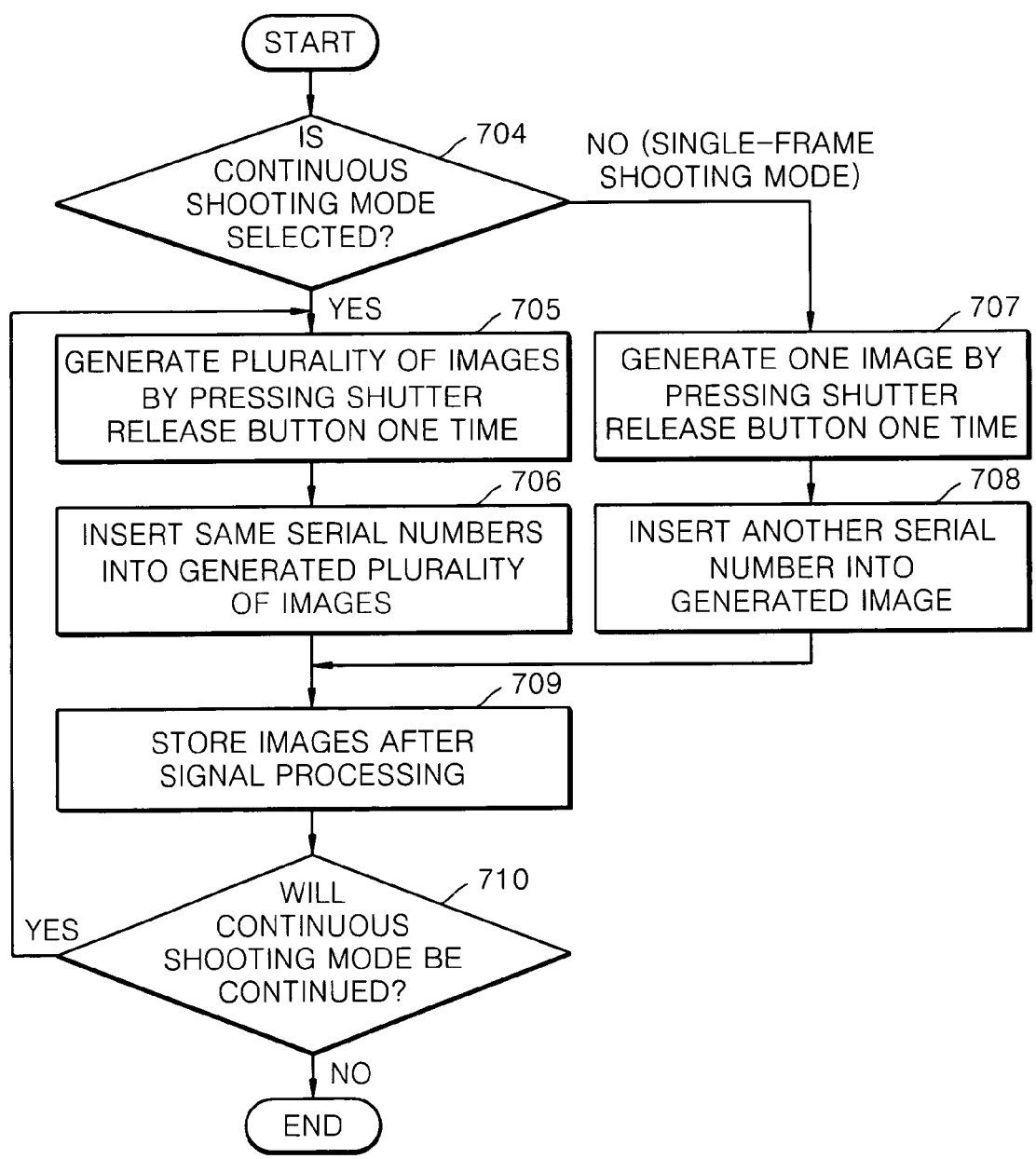

Referring to FIG. 7B, operations S2 and S3 of FIG. 2 for inserting and storing a serial number after an image is captured in a continuous shooting mode will be described in detail.

The DSP 160 determines whether the user selects a continuous shooting mode (operation 704).

If the user selects the continuous shooting mode, when the user presses the shutter-release button 110-1, the DSP 160 recognizes this and generates a plurality of images (operation 705).

Thereafter, the DSP 160 sequentially inserts serial numbers into the images (operation 706). The DSP 160 inserts the same serial numbers into the images captured in the continuous shooting mode, for example, serial numbers of "2, 2, and 2" are sequentially inserted into three captured images. Although the identification numbers are inserted in the numeric format, the present invention is not limited thereto. Thus, the identification numbers may be alphabet characters or special symbols. The digital image processing apparatus 100 checks a serial number inserted into the last image captured in the continuous shooting mode at the time of booting, so as to insert another serial number. For example, if a serial number of "1" is inserted into a plurality of images generated in the last time of continuous shooting, a serial number of "2" is inserted into a plurality of images generated in the current time of continuous shooting.

As shown in FIG. 4, the DSP 160 stores serial numbers in the MakerNote data area of APP1 Marker area of the APP1 area of the Exif file. Similarly, the DSP 160 stores the location and size of the MakerNote data area storing the serial number in the MakerNote data area of the $0^{th}$ IFD area of the APP1 Marker area of the APP1 area of the Exif file.

On the other hand, if the user selects the single-frame shooting mode, when the user presses the shutter-release button 110-1 one time, the DSP 160 recognizes this and generates one image (operation 707).

Thereafter, the DSP 160 inserts a serial number into the generated image (operation 708). The DSP 160 inserts another serial number which is different from the serial number inserted into the image captured in the continuous shooting mode, for example, "0", into the image captured in the single-frame shooting mode. As shown in FIG. 4, the DSP 160 stores the serial number inserted into the image captured in the single-frame shooting mode in the MakerNote data area of the APP1 Marker area of the APP1 area of the Exif file. Similarly, the DSP 160 stores the location and size of the MakerNote data area storing the serial number in the MakerNote data area of the $0^{th}$ IFD area of the APP1 Marker area of the APP1 area of the Exif file.

A plurality of images captured in the continuous shooting mode and inserted with the same serial numbers, or an image captured in the single-frame shooting mode and inserted with another serial number are subjected to the signal processing by the image processor 130 under the control of the DSP 160 and are thereafter stored in the storage 150 (operation 709).

The DSP 160 determines whether the user selects the continuous shooting mode. If the continuous shooting mode is selected, the process returns to operation 706. Otherwise, shooting is completed (operation 710).

Figure 7C:
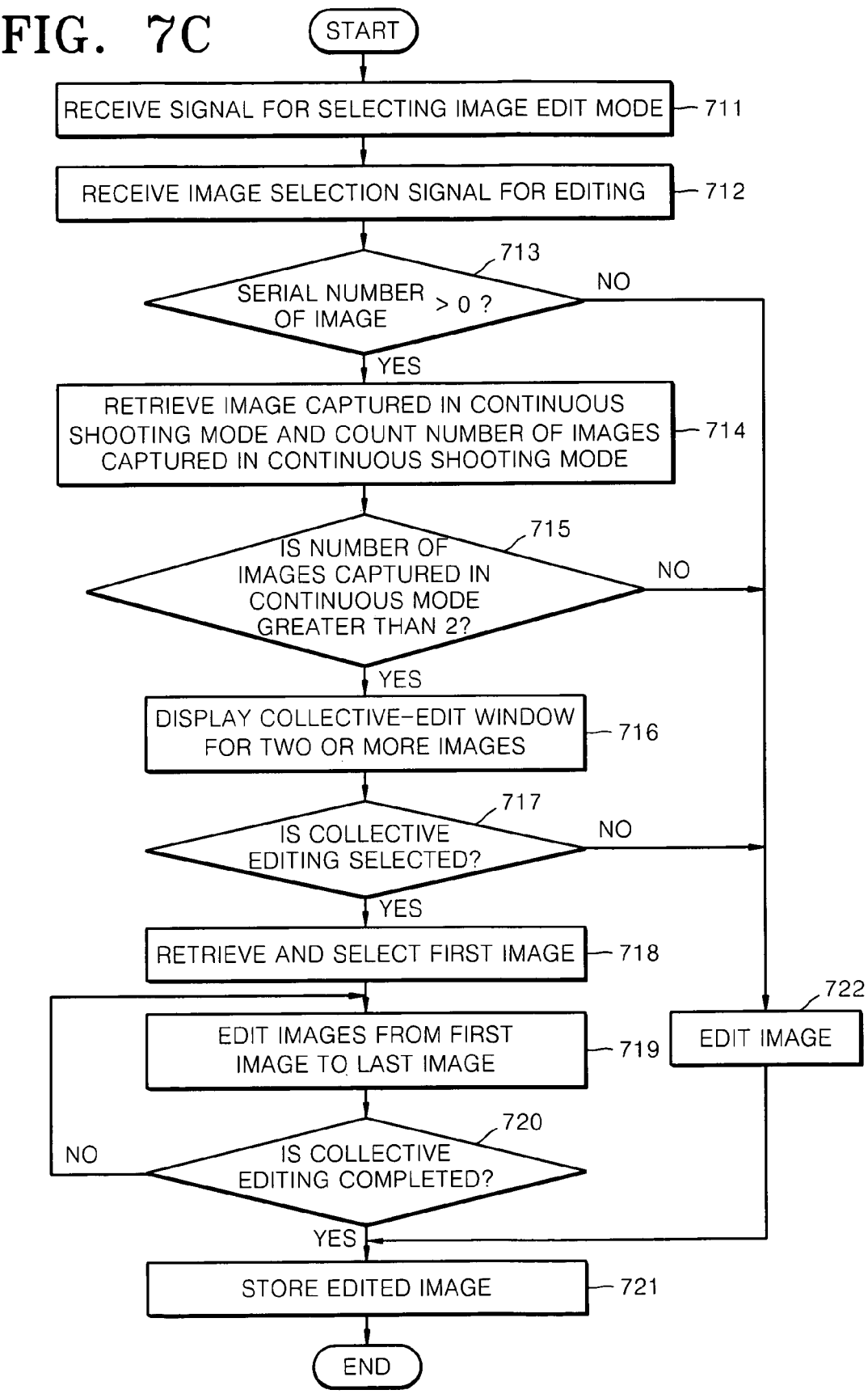

Referring to FIG. 7C, operation S4 of FIG. 2 for editing an image captured in a continuous shooting mode will be described in detail.

In order to edit an image, the user selects a desired editing mode from an image editing menu provided by the digital image processing apparatus 100. Then, the DSP 160 receives a signal for selecting an image editing mode (operation 711).

After the image editing mode is selected, the user retrieves an image to be edited. When the image is selected, the DSP 160 receives an image selection signal (operation 712).

After receiving the image selection signal, the DSP 160 retrieves a serial number inserted into the selected image so as to determine whether the retrieved serial number is greater than 0 (operation 713). The DSP 160 checks the location of the MakerNote data area by sequentially accessing the APP1 area, the APP1 Marker area, the $0^{th}$ IFD area, and the MakerNote area of the Exif file. Thereafter, the DSP 160 retrieves the serial number stored in the MakerNote data area by sequentially accessing the APP1 area, the APP1 Maker area, and the MakerNote data area of the Exif file, so as to determine whether the retrieved serial number is greater than 0.

If the serial number stored in the MakerNote data area is greater than 0, the DSP 160 determines that the selected image has been captured in the continuous shooting mode. Then, the DSP 160 retrieves the image captured in the continuous shooting mode, and counts the number of images captured in the continuous shooting mode (operation 714).

As described above, images captured in the continuous shooting mode can be retrieved in two ways. First, images are captured in the continuous shooting mode, and some of them are deleted by the user, so that the number of retrieved images is only one. Second, images are captured in the continuous shooting mode, and the images are not deleted by the user, or even if deleted, a plurality of image captured in the continuous shooting mode are still retrieved. In this case, the DSP 160 counts the number of images captured in the continuous shooting mode.

Figure 7D:
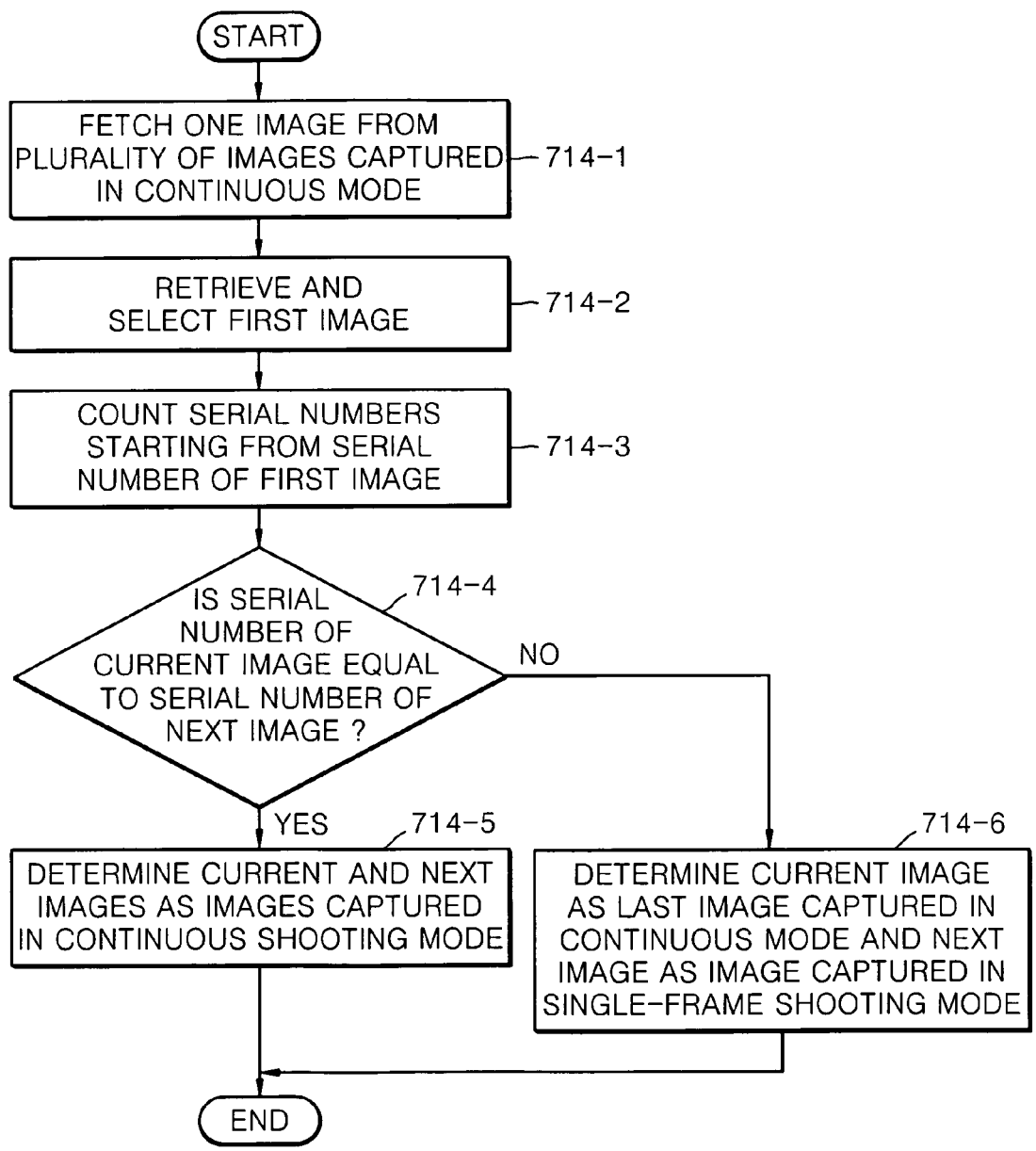

FIG. 7D illustrates a second case of operation 714, that is, images are captured in the continuous shooting mode, and the images are not deleted by the user, or even if deleted, a plurality of image captured in the continuous shooting mode are still retrieved.

First, the DSP 160 fetches one image of a plurality of images captured in the continuous shooting mode from the storage 150 (operation 714-1).

Thereafter, the DSP 160 retrieves and selects a first image from the images (operation 714-2).

Figure 7E:
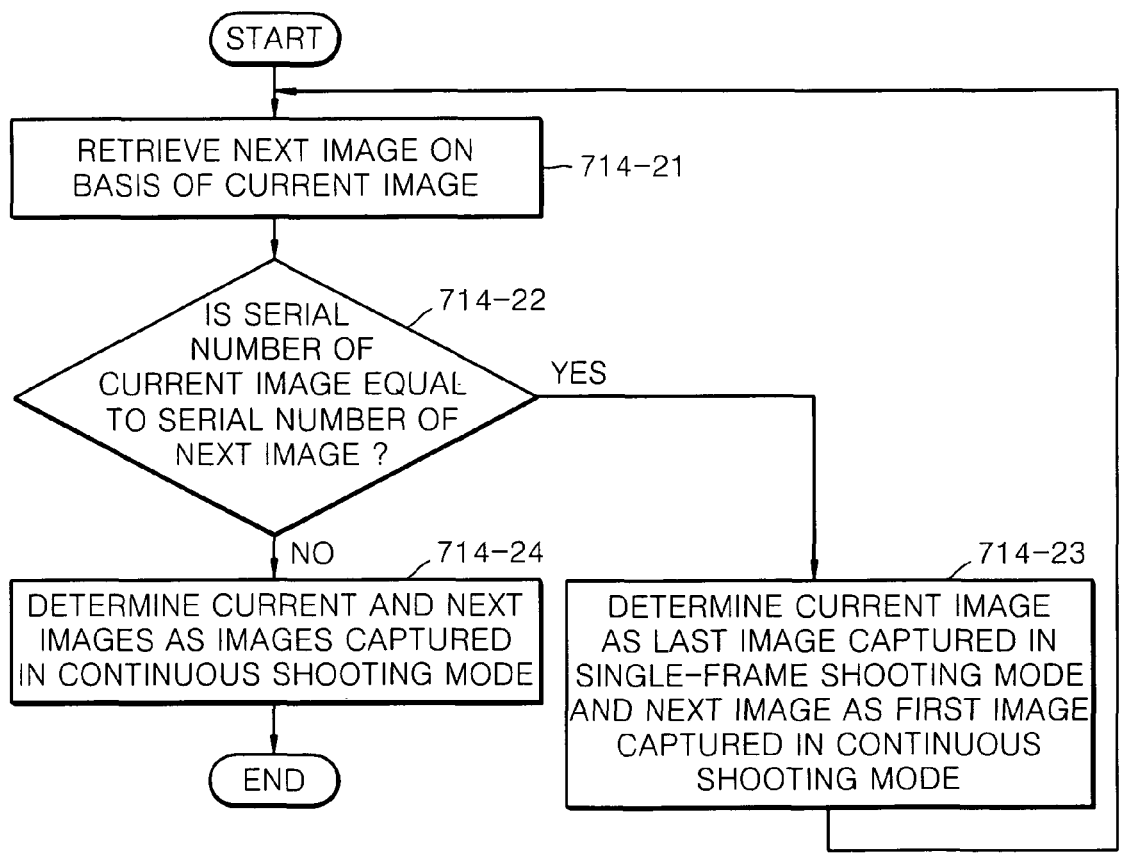

FIG. 7E illustrates a method of retrieving and selecting the first image from a plurality of images captured in the continuous shooting mode.

The DSP 160 retrieves a next image on the basis of a current image (operation 714-21).

While retrieving, the DSP 160 determines whether a serial number of the current image is equal to a serial number of the next image (operation 714-22). The DSP 160 performs this operation to determine a first image captured in the continuous shooting mode. Since all of the images captured in the continuous shooting mode have the same serial number, the first image can be retrieved only by using its serial number regardless of a file number of the image.

If the serial number of the current image is equal to the serial number of the next image, the DSP 160 determines that the current and the next images are images captured in the continuous shooting mode (operation 712-24).

If the serial number of the current image is not equal to the serial number of the next image, the DSP 160 determines that the current image is an image captured in the single-frame shooting mode, and/or the next image is an image captured in the—continuous shooting mode (operation 712-25).

For example, it will be assumed that a file name of sa700003.jpg is generated in the single-frame shooting mode, and its serial number is 0. In addition, after an image is captured in the single-frame shooting mode, three images having file names of sa700004.jpg, sa700005.jpg, and sa700006.jpg are captured in the continuous shooting mode. The serial numbers of the three images are assumed to be "1".

In this case, if the current image has a file name of sa700004.jpg and a serial number of "1", and the next image has a file name of sa700005.jpg and a serial number of "1", then the serial number of the current image is equal to the serial number of the next image. Thus, the DSP 160 determines that the current and next images are images captured in the continuous shooting mode.

However, if the current image has a file name of sa700003.jpg and a serial number of "0", and the next image has a file name of sa700004.jpg and a serial number of "1", since the serial number of the current image is not equal to the serial number of the next image, the DSP 160 determines that the current image is an image captured in the single-frame shooting mode, and the next image is a first image captured in the continuous shooting mode.

Thereafter, the DSP 160 counts serial numbers in the ascending order starting from the serial number of the first image selected (operation 712-3).

Subsequently, the DSP 160 determines whether the serial number of the current image is equal to the serial number of the next image (operation 714-4). The DSP 160 performs this operation to determine a last image captured in the continuous shooting mode.

If the serial number of the current image is equal to the serial number of the next image, the DSP 160 determines that the current and next images are images captured in the continuous shooting mode (operation 712-5).

On the other hand, if the serial number of the current image is not equal to the serial number of the next image, the DSP 160 determines that the current image is the last image captured in the continuous shooting mode, and the next image is the image captured in the single-frame shooting mode (operation 712-6).

For example, it will be assumed that three images are captured in the continuous shooting mode to have file names of sa700004.jpg, sa700005.jpg, and sa700006.jpg. The three images have the same serial number of "2". After taking photographs in the continuous shooting mode, an image is captured in the single-frame shooting mode to have a file name of sa700007.jpg and a serial number of "0".

In this case, if the current image has a file name of sa700005.jpg and a serial number of "2", and the next image has a file name of sa700006.jpg and a serial number of "2", since the serial number of the current image is equal to the serial number of the next image, the DSP 160 determines that the current and next images are images captured in the continuous shooting mode.

On the other hand, if the current image has a file name of sa700006.jpg and a serial number of "2", and the next image has a file name of sa700007.jpg and a serial number of "0", since the serial number of the current image is not equal to the serial number of the next image, the DSP 160 determines that the current image is a last image captured in the continuous shooting mode and the next image is an image captured in the single-frame shooting mode.

Accordingly, the number of images captured in the continuous shooting mode can be counted.

Returning to FIG. 7C, the DSP 160 counts the number of images captured in the continuous shooting mode so as to determine whether the number of images captured in the continuous shooting mode is greater than 2 (operation 715). The rest of operations are the same as those of FIG. 3C. Thus, detailed descriptions thereof will be omitted.

If the number of images captured in the continuous shooting mode is greater than 2, the DSP 160 displays a collective-edit window for two or more images (operation 716).

If a collective editing is selected (operation 717), the DSP 160 retrieves and selects the first image (operation 718). Then, the DSP 160 edits all images from the first image to the last image (operation 719).

If the DSP 160 determines that editing has been completed for all images captured in the continuous mode from the first image to the last image (operation 720), the edited images are stored (operation 721).

Although not shown, if the number of images captured in the continuous shooting mode is greater than 2, when the DSP 160 displays the collective-edit window for two or more images, the user may select collective or individual editing. In this case, if an image to be edited is selected by using the function key 1104 from all of the images captured in the continuous shooting mode, the same editing operation is applied to only the images selected by using the function button 1104.

Referring to FIG. 7C, if a captured image has a serial number of 0, or the number of images captured in the continuous shooting mode is one, or only one image is edited through the collective editing window, image editing is performed only for the associated image (operation 722).

According to the present invention, a plurality of images captured in a continuous shooting mode can be collectively or individually edited at the same time, thereby maximizing a user's convenience.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for editing images on a digital image processing apparatus, the method comprising:
   (a) in response to a shutter-release button of the digital image processing apparatus being pressed a single time, capturing a plurality of photographic images;
   (b) recognizing the plurality of images as having been captured in a continuous shooting mode of the digital image processing apparatus;
   (b1) for each of the plurality of images, creating a file in which the image is stored, thereby resulting in a plurality of files;
   (b2) for each of the plurality of files, inserting an identification number of the image into the file so that the image is recognizable by the digital image processing apparatus as an image that was captured in the continuous shooting mode;
   (b3) based on the identification number, determining which image of the plurality of images is a first of the plurality of images to have been captured;

(b4) based on the identification number, determining which image of the plurality of images is a last of the plurality of images to have been captured;

(c) retrieving all of the images from the first image to the last image; and (d) applying the selected editing operation to all of the retrieved images.

2. The method of claim 1, wherein the file is an exchangeable image format file, and the identification number is stored in the MakerNote data area of the file.

3. The method of claim 1, further comprising, prior to step (a), initializing the identification number.

4. The method of claim 3, wherein the inserting step comprises inserting a unique identification number into each of the plurality of files in ascending order with respect to the previously inserted identification number.

5. The method of claim 4, further comprising receiving a selection of a subset of the plurality of captured images, wherein step (d) comprises performing the selected editing operation to the subset of images.

6. The method of claim 4, wherein each of the plurality of files has a file number, the method further comprising:

comparing the file number of a current file of the plurality of files with the file number of a previous file of the plurality of files;

comparing the identification number of the image stored in the current file with the identification number of the image stored in the previous file;

based on the comparing steps, determining which image of the plurality of images is the first of the plurality of images to have been captured;

counting sequential identification numbers starting from an identification number of the retrieved first image;

repeating the comparing steps;

based on the comparing steps, determining which image of the plurality of images is the last of the plurality of images to have been captured;

retrieving all of the images from the first image to the last image; and applying the selected editing operation to all of the retrieved images.

7. The method of claim 1, further comprising, prior to (a), checking an identification number inserted into the last image captured of the plurality of images.

8. The method of claim 7, wherein the images are stored in a plurality of files, each file containing an image of the plurality, the method further comprising inserting the same identification number into the each of the plurality of files.

9. The method of claim 8, further comprising receiving a selection of a subset of the plurality of captured images, wherein step (d) comprises performing the selected editing operation to the subset of images.

10. The method of claim 8, wherein each of the plurality of files has a file number, the method further comprising:

comparing the file number of a current file of the plurality of files with the file number of a previous file of the plurality of files;

comparing the identification number of the image stored in the current file with the identification number of the image stored in the previous file;

based on the comparing steps, determining which image of the plurality of images is the first of the plurality of images to have been captured;

counting sequential identification numbers starting from the identification number of the first image;

repeating the comparing steps;

based on the comparing steps, determining which image of the plurality of images is the last of the plurality of images to have been captured;

retrieving all of the images from the first image to the last image; and applying the selected editing operation to all of the retrieved images.

11. A method for editing images on a digital image processing apparatus, comprising:

(a) taking photographs in a continuous shooting mode in which a plurality of images are captured by pressing a shutter-release button one time;

(b) assigning identification numbers to the plurality of captured images in ascending order;

(c) subsequently identifying the plurality of images based on the identification numbers; and (d) in response to a user input, performing the same editing operation on all of the plurality of images;

wherein the plurality of images is stored in a plurality of files, each file having a file number and each file including an image of the plurality of images, the method further comprising:

retrieving a first image of the plurality images by comparing identification numbers of current and previous images and comparing file numbers of the files of the current and previous images;

counting sequential identification numbers starting from an identification number of the retrieved first image;

retrieving a last image of the plurality of images by comparing identification numbers of current and previous images and comparing file numbers of the files of the current and previous images;

retrieving all other images between the first image and the last image; and applying the editing operation to the retrieved images from the first image to the last image.

12. The method of claim 11, wherein each of the plurality of images is stored in a file, and the identification number assigned to the image is stored in a MakerNote data area of the file.

13. An image editing method for operating a digital image processing apparatus, the method comprising:

(a) determining a last-used identification code;

(b) taking photographs in a continuous shooting mode in which a plurality of images are captured by pressing a shutter-release button one time;

(c) inserting an identification code into a data file of each of the images captured in step (b), the inserted identification code being distinguishable from the last-inserted identification code;

(d) using the identification code of each of the plurality images to identify the plurality of images as having been captured in a continuous shooting mode; and (e) performing the same editing operation on each of the plurality of images;

wherein step (e) comprises:

retrieving a first image of the plurality based on a comparison of the identification codes of current and previous images;

counting sequential identification codes starting from the identification code of the retrieved first image;

retrieving a last image of the plurality based on a comparison of the identification codes of the current and previous images;

retrieving all other images between the first image and the last image; and performing the same editing operation to the retrieved images from the first image to the last image.

14. The image editing method of claim 13, wherein the identification code is stored in a MakerNote data area of the data file.

15. The method of claim 13, wherein the identification code is an identification number.

16. A digital imaging apparatus comprising:
an image capture unit comprising a lens and a charge-coupled device;
a user input unit;
a display;
an image processor;
a storage, and
a digital signal processor communicatively linked to the image capture unit, the user input unit, the display, the image processor, and the storage, wherein
in response to a single user manipulation of the user input unit, the image capture unit captures a plurality of images in a continuous shooting mode, the images being capture based on light entering the lens and signals generated by the charge-coupled device that are representative of the light,
for each captured image, the image processor creates an image file, inserts into the file an identification code that identifies the image to the digital imaging apparatus as having been captured in the continuous shooting mode, and stores the file in the storage;
based on the identification code, the image processor determines which image of the plurality of images is a first of the plurality of images to have been captured;
based on the identification code, the image processor determines which image of the plurality of images is a last of the plurality of images;
the image processor retrieves all of the images from the first image to the last image;
in response to a user manipulation of the user input unit, the display shows at least one of the plurality of images,
in response to a user selection of an editing function, the image processor performs the selected editing function on each of the plurality of images.

17. The apparatus of claim 16, wherein the inserted identification numbers are ordered according to the time of the creation of the files.

* * * * *

UNITED STATES PATENT AND TRADEMARK OFFICE
CERTIFICATE OF CORRECTION

| | | |
|---|---|---|
| PATENT NO. | : 7,804,524 B2 | Page 1 of 1 |
| APPLICATION NO. | : 11/699155 | |
| DATED | : September 28, 2010 | |
| INVENTOR(S) | : Jin-pyo Gwak | |

It is certified that error appears in the above-identified patent and that said Letters Patent is hereby corrected as shown below:

In Claim 16, Column 18, line 11, replace "the plurality of images" with -- the plurality of images to have been captured --

Signed and Sealed this
Fifteenth Day of February, 2011

David J. Kappos
*Director of the United States Patent and Trademark Office*